United States Patent
Eibner et al.

(12) 
(10) Patent No.: US 6,173,517 B1
(45) Date of Patent: Jan. 16, 2001

(54) LUMINOUS DISPLAY ELEMENT WITH A LIGHT COUPLED INTO A LIGHT CONDUCTING HOUSING

(75) Inventors: Wolfgang Eibner; Wolf Albrecht; Hartmut Illner, all of Berlin (DE)

(73) Assignee: osa Elektronik GmbH, Berlin (DE)

(*) Notice: Under 35 U.S.C. 154(b), the term of this patent shall be extended for 0 days.

(21) Appl. No.: 09/036,382

(22) Filed: Mar. 6, 1998

(30) Foreign Application Priority Data

Mar. 27, 1997 (DE) .......................................... 297 06 201 U

(51) Int. Cl.⁷ ...................................................... G09F 13/00
(52) U.S. Cl. ................. 40/544; 40/541; 40/550; 362/240; 362/800; 362/812
(58) Field of Search .............................. 40/550, 547, 544; 362/800, 240, 216, 812

(56) References Cited

U.S. PATENT DOCUMENTS

| 4,908,743 | * | 3/1990  | Miller ............................... 362/240 X |
| 5,062,027 | * | 10/1991 | Machida et al. .................. 362/216 X |
| 5,222,799 | * | 6/1993  | Sears et al. ....................... 362/800 X |
| 5,418,384 | * | 5/1995  | Yamana et al. ................... 362/800 X |
| 5,688,042 | * | 11/1997 | Madadi et al. ........................ 362/240 |
| 5,746,497 | * | 5/1998  | Machida ............................ 362/800 X |

FOREIGN PATENT DOCUMENTS

| 9207252      | 10/1992 | (DE) . |
| 9207253      | 10/1992 | (DE) . |
| 4311018A1    | 10/1994 | (DE) . |
| 296 03 006 U1 | 5/1996 | (DE) . |

* cited by examiner

*Primary Examiner*—Terry Lee Melius
*Assistant Examiner*—James M Hewitt
(74) *Attorney, Agent, or Firm*—Collard & Roe, P.C.

(57) ABSTRACT

A luminous display element having a light line positioned within a light-housing. The light line includes a series of SMD-LED-components arranged on a carrier material. On either end of the carrier material are connection elements which allow the carrier material to connect to other lights. The light-housing has a non-rectangular cross-section, and its length is multiple times its height. Depending upon the desired form of illumination, the light line can be arranged either within the light-housing, or outside the light-housing and extend along its longitudinal axis.

3 Claims, 4 Drawing Sheets

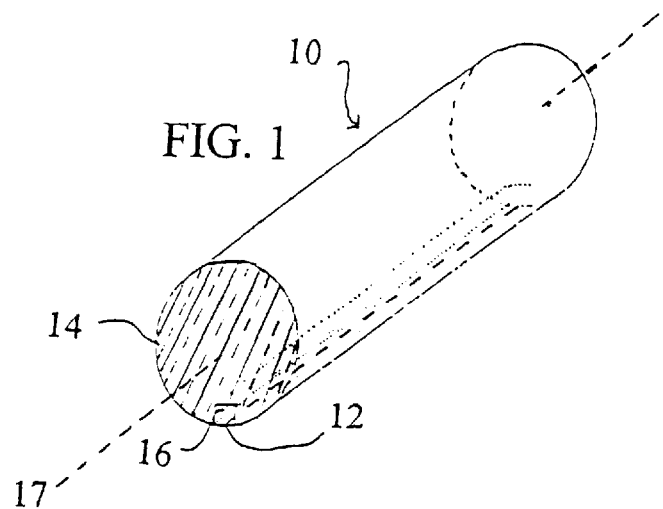
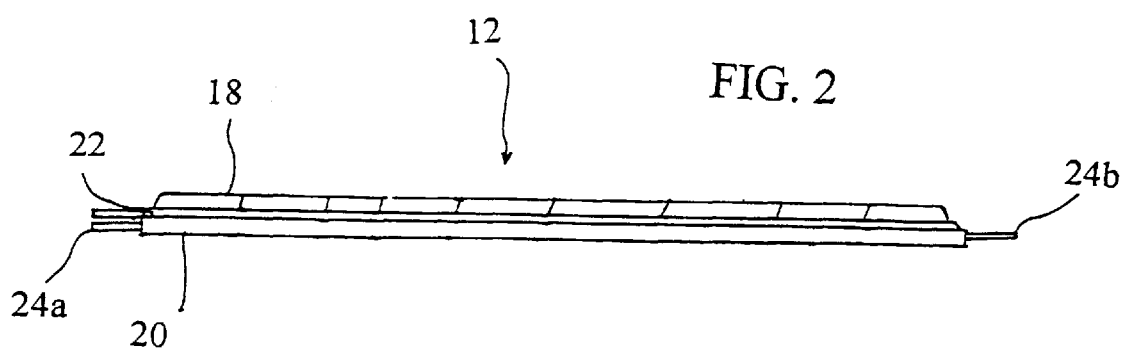

LUMINOUS DISPLAY ELEMENT WITH A LIGHT COUPLED INTO A LIGHT CONDUCTING HOUSING

BACKGROUND OF THE INVENTION

1. Field of the Invention

The present invention relates to a lighted display element which comprises a light line coupled to a light-conducting housing. Due to the design of the light-conducting housing, the light element is particularly suitable for indirect lighting.

2. The Prior Art

Lighted display elements are disclosed in the prior art DE 4,311,018 A1. Here, pc board strips consisting of surface mounted light emitting-diode (SMD-LED) components are arranged in the light-conducting housing in recesses above an optical coupling medium. These pc board strips are arranged in the horizontal and/or vertical direction of light incidence. If the luminous elements are placed in the light-housing the horizontal direction of incidence provides the housing with at least one additional reflector edge. In this case, the display element has an unsealed outer surface with good optical conductivity, and the other side surfaces of the housing are sealed.

German Design Patent No. 29 603 006 discloses another light display device. This solution comprises a mounting rail, in which a reflector with a recess is installed, and at least one SMD-LED pc board strip is arranged in the recess. In this case, the reflector with the pc board strip is embedded in a cover in the mounting rail. In addition, an information carrier is disposed on the light-conducting housing.

SUMMARY OF THE INVENTION

It is an object of the present invention to develop a luminous display element having high light yield.

It is another object of the invention to provide a display element that is inexpensive to manufacture, simple in design and easy to install.

Accordingly, the invention provides a display element that is formed by the combination of a light line fed into a transparent housing. The light or luminous line is composed of a series of surface mounted LED (SMD-LED) elements that are mounted on a carrier material in the form of a pc board strip. The housing has a non-rectangular cross-section and its length is multiple times its height. The light line is fed into the long side of the housing and extends along its longitudinal axis. This design allows for high light density.

According to one feature of the invention, the light-conducting housing has a profile with a circular cross-section that extends in the form of a rod or a bar.

The circular cross-section-housing houses a pc board strip that is arranged on or in a recess of the light-conducting housing depending on the desired reflection angles. A flat angle of reflection is obtained with a flat recess directly within the marginal area of the light-conducting housing. The depth of the recess is variable for obtaining different luminous effects. The greater the depth of the recess, i.e., the farther such recess is removed from the marginal area, the greater the angle of reflection. The circular cross-sectional shape of the light-conducting housing is suitable, for example, for indirect illumination, as well as for illuminating narrow areas. To avoid loss of light, it is important to assure a good optical connection when coupling the light line to the housing.

The luminous display elements designed in the form of a light bar or strand have a standard length. The elements are designed in such a way that they are connectable with each other and form oblong luminous surfaces. In this case, the elements have mechanical and electrical connection elements.

In another embodiment of the invention, the light-conducting housing has a profile that is not in the form of a rod or bar. For example, the housing can be designed in the form of a letter. The carrier material is designed to be transparent and flexible so that it is capable of adapting to the given shape. The SMD-LED-components are pressed into the flexible carrier material, which is designed as a deformable reflector. The components are received in the strip material in a positively locked way, whereby the strip material acts at the same time as a diffuser and supports the distribution of light across the entire width of the strip material. This novel field of application opens new possibilities especially in the field of advertising. The illuminated lettering is free of glare and has minimal energy costs. Furthermore, since the system is almost totally free of maintenance it constitutes a significant advantage for this illumination technology.

In another embodiment of the invention, the light-housing has a substantially T-shaped cross-section. A reflector is coupled to the light-housing and is designed to form a rectangule cross-section. In addition, the light line is arranged on a surface of the reflector and the connection between the light-reflector and the light-conducting housing is designed for good optical conductivity. As a rule, the light line exits only on one surface; the other surfaces of the light-conducting housing are designed to be reflecting.

An optimum condition of total reflection is produced due to the substantially T-shaped cross-sectional profile of the transparent cover in the rod-like or bar-like light-conducting housing. Based on the minimal dimensions of the reflector, this means that the light-conducting housing provides many new applications. With one possible variation in the cross-sectional profile, the height and width dimensions can amount to only 8×8 mm. Typical fields of application include the illumination of house or street numbers, street signs, systems for providing directions in buildings, signs of medical offices, pictograms, advertising displays, company logos, etc. These luminous elements referred to as light strips may be used just as well for luminous markings, on the contours of building and commercial facilities. The following applications are stated as examples: border or guide lines, edges of railway station platforms, staircase steps, staircase railings, or also line-shaped luminous markings on commercially used installations. To obtain a luminous effect during daytime hours, a colored foil can be arranged in front of the luminous surface.

According to another feature of the invention, the light-conducting housing is designed in the form of a rod-like or bar-like hollow housing. The inlet and outlet opening of the hollow housing is designed to be sealed in a reflecting way. The light line is fed into the housing along its longitudinal axis. The light line can be coupled into the light-conducting housing horizontally, vertically, or also through a combination of both, depending on the purpose of the application and the requirements.

Furthermore, it is possible to fit the carrier material with lights having two or more colors, and to control these lights with a generally known electronic control system.

If possible, the reflector, which is preferably made of plastic material, has a white color shade. The luminous line is embedded in the reflector in such a way that no loss of light can occur. As a rule, the strip is mounted by gluing the strip into the reflector.

When used as a display element, a separate light-conducting housing is adapted to the size of the displayed symbol. In this case, the symbol is arranged on the light-housing and the light-housing has good optical conductivity. A light outlet surface and the separate light conducting housing is arranged on the crossbar of the letter "T" on the T-shaped cross-section of the light-housing.

Another embodiment of the invention includes a light-housing having a triangular cross-section for special applications. One surface of the triangular cross-section is a reflector. Such profiles are usable, for example for indirect illumination as well.

For purposes of providing chain-shaped luminous elements, the reflector and the light-conducting housing are joined with each other in an airtight manner. The elements are designed so that they can be connected to each other by gluing. To do this, the elements are provided with specific electrical and mechanical connection elements on their ends. Furthermore, this invention allows the light-housing to have any technologically manageable cross-section. In addition, it is understood that the reflector and the light-conducting housing are adapted to each other so as to avoid loss of light.

The pc board strips or bars that are serving as carrier material are embedded in the lower part of the light bar so that they are protected against touching (contact), soiling and also against penetrating water. They are equipped with a connection cable for direct connection to a 12-volt, or primary voltage. Operation with other dc and ac voltages in the first voltage range is possible.

Due to their low mass and thus low weight, the light line and light-housing forming light bars or strips can be mounted without problems on metal parts and also brickwork, using a suitable adhesive. Suitable adhesives include those of the silicone rubber type, for example.

As a rule, the light-conducting housing consists of colorless, clear transparent material, in most cases acrylic glass (PMMA). The edges of such material are subjected to a treatment so as to avoid loss of light. The light-housing can also make use of a colorless material that has particles with different light refraction properties. The light rays are slightly deflected from their straight path by the embedded particles and exit again with uniform distribution across the entire surface of the board with very flat angles. This type of deflection is referred to as "forward scatter". In addition, light-scattering elements arranged in the housing assure that the board is illuminated with brightness over its entire surface. With light-distributing boards or panels scattering the light in the forward direction, it is possible to design signs with both reflection and illumination on one or both sides. In the latter case, different information can be displayed on the two sides of the sign or panel.

BRIEF DESCRIPTION OF THE DRAWINGS

Other objects and features of the present invention will become apparent from the following detailed description considered in connection with the accompanying drawings which discloses several embodiments of the present invention. It should be understood, however, that the drawings are designed for the purpose of illustration only and not as a definition of the limits of the invention.

In the drawings, wherein similar reference characters denote similar elements throughout the several views:

FIG. 1 is a perspective view of a luminous element of the invention, having a light-conducting housing with a circular cross-section;

FIG. 2 is a cross-sectional view of the light line formed by SMD-LED components mounted on a carrier material.

FIG. 3b is a side view of the luminous element of FIG. 3a;

FIG. 3c is a cross-sectional view taken along section A—A of FIG. 3a;

DETAILED DESCRIPTION OF PREFERRED EMBODIMENTS

Figure 3A:
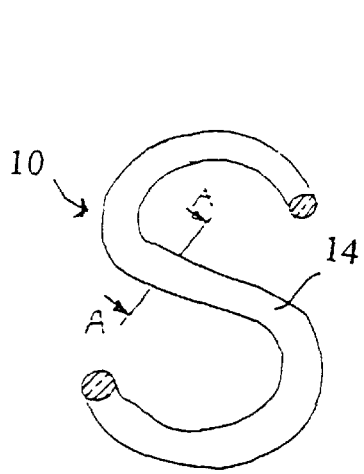
FIG. 3a is a front view of a luminous element of the invention in the form of a letter.

Referring to FIG. 1, there is shown a perspective view of a luminous element 10 which comprises a light or luminous line 12 arranged in a light-conducting housing 14. Housing 14 has a circular cross-section shape. A recess 16 extends along the longitudinal axis 17 of housing 14. Depending on the luminous effect to be achieved, line 12 can be arranged either in recess 16 or on the outer surface of the cylindrical light-housing 14 (see FIG. 3c).

FIG. 2 is a cross-sectional view of light line 12. Light line 12 consists of a series of SMD-LED components 18 attached to a carrier material or pc board 20. Components 18 can be fastened to carrier material 20 by an electrically conductive adhesive material 22. Carrier material 20 can also have electrical connection elements 24a and 24b attached to either end to allow a series of light lines 12 to be connected together. These connection elements allow line-shaped luminous strips, luminous lines or other desired configurations to be produced.

Figure 3B:
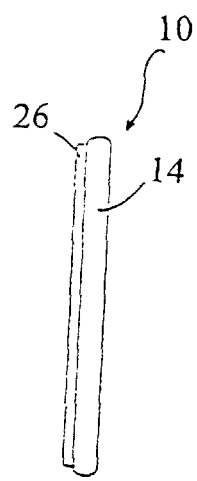
Figure 3C:
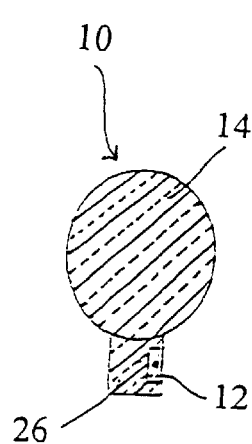

FIGS. 3a and 3b show luminous element 10 where the light-conducting housing 14 has varying shapes even extending in the non-linear manner. For example FIG. 3a shows the light conducting housing 14 having the shape of the letter "S" formed by an elastic transparent reflector. In FIG. 3b the light-conducting housing 14 is in the form of a rod or a bar. FIGS. 3b and 3c show the arrangement of the elastic transparent reflector 26 with flexible line 12. In this case, flexible line 12 can extend longitudinally in a non linear manner. Both components, i.e. reflector 26 and line 12, permit a flexible luminous line to be formed. Reflector 26 consists of a flat deformable material that is permeable to light. Due to the flexibility of line 12, it is possible to provide for light coupling both in letters and for other structures or configurations. Another field of application of the invention is to use the luminous element for advertising purposes. For example, in addition to company names and logos, neon-lit letters can be illuminated with this novel back-lighting technology as a reasonably priced alternative for advertising.

Figure 4A:
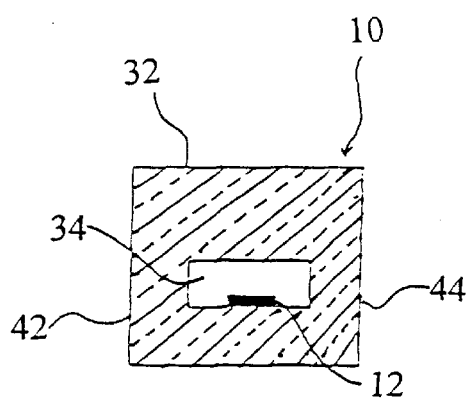
FIG. 4a is a cross-sectional view of a luminous element of the invention with a light-conducting housing designed as a hollow profile.

FIG. 4a shows a sectional view of luminous element 10. In this case, light line 12 is coupled into an oblong light-conducting housing 32 having a rectangular cross-section.

Extending along the length of housing 32 is a hollow profile 34. Luminous line 12 is arranged in hollow profile 34. To avoid loss of light, the individual side surfaces 42 and 44 of light-conducting housing 32 are designed as reflecting while the other surface are designed as transparent or light entry or light exit surface.

Figure 4B:
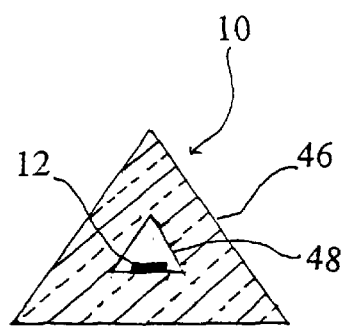
FIG. 4b. is a cross-sectional view of a luminous element of the invention wherein the light-housing has a triangular cross-section.

FIG. 4b shows a cross-sectional view of luminous element 10 comprising luminous line 12 and a light-housing 46 that has a triangular cross-section. Luminous line 12 is fed into a hollow profile 48 on light-housing 46.

Figure 5:
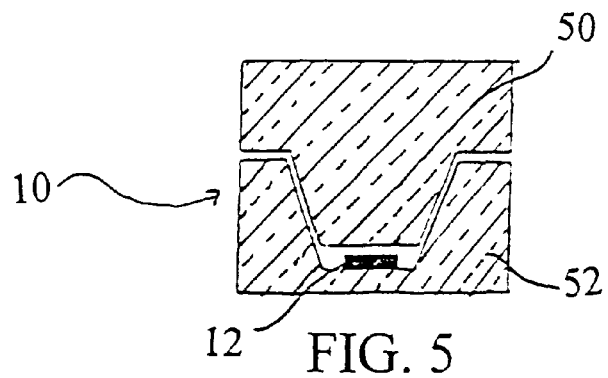
FIG. 5 is a cross-sectional view of a luminous element of the invention with a transparent cover substantially in the form of a "T" or dove tail.

FIG. 5 shows a cross-sectional view of a luminous element whose oblong light-conducting housing 50 has a substantially T-shaped cross-section. In this embodiment, a reflector 52 compliments this light-conducting housing 50 so as to form a light-housing having a rectangular cross-section. In addition, luminous line 12 is arranged on one surface of reflector 52.

Figure 6:
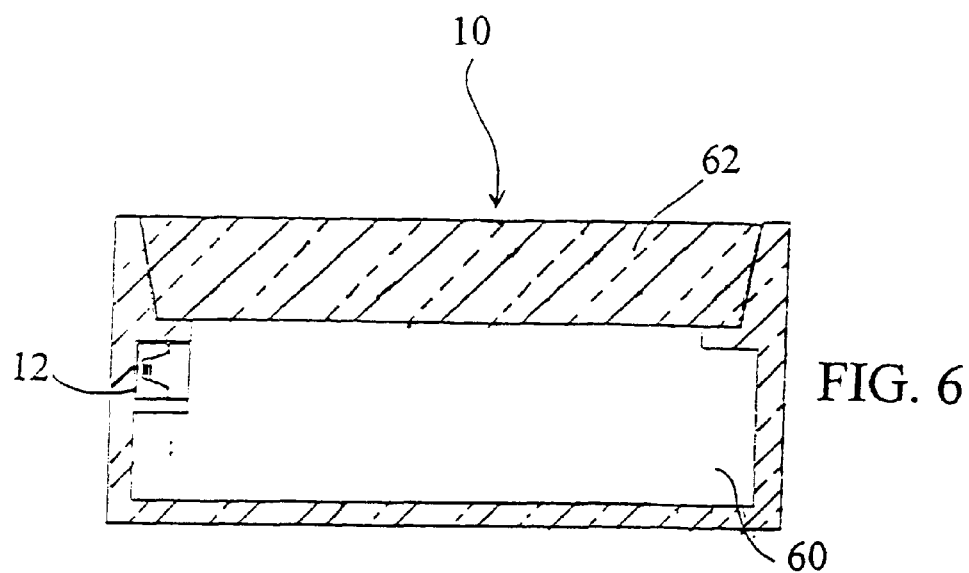
FIG. 6 is a cross-sectional view of a luminous element of the invention arranged in a cavity.

FIG. 6 is a cross-sectional view of an arrangement of a luminous element 12 in a cavity 60. Cavity 60 is illuminated by luminous element 12, whereby cavity 60 is provided with a transparent cover 62. Cavity 60 can serve, for example for marking a discretion or border line as commonly used in banks. However, cavity 60, when luminated, may also be used to mark dangerous edges such as, for example edges of railway station platforms.

Figure 7:
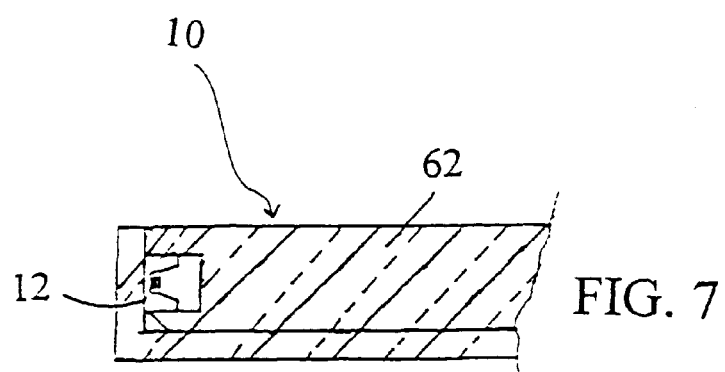
FIG. 7 is a cross-sectional view of a cutout of a luminous element of the invention, which is integrated in a transparent cover.

FIG. 7 illustrates another embodiment of the invention of FIG. 6, by a cross-sectional view. In FIG. 7, luminous element 12 is directly integrated in transparent cover 62. This embodiment can also be applied to illuminate discretion or border lines or markings.

Figure 8:
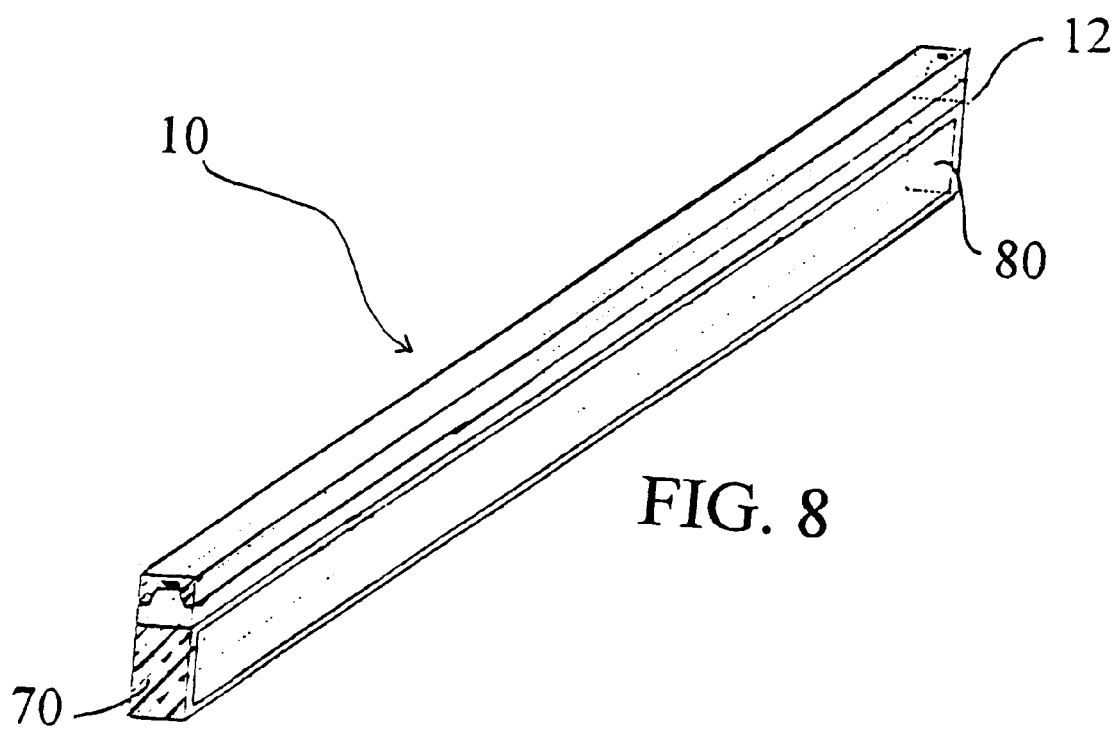
FIG. 8 is a perspective view of a luminous strip or bar formed with luminous elements.

FIG. 8 shows a luminous strip formed by luminous element 10. Light line 12 is coupled or fed into this luminous strip, which also comprises a separate transparent light-conducting housing 70, formed by a light bar having the shape shown in FIG. 5. A colored foil 80 is arranged on top of the surface of the luminous strip facing the viewer so as to increase or intensify the luminous effect. In daylight, such colored foil 80 marks the contour to be highlighted. During darkness, illumination of the contour is intensified further through the light that is applied.

Such a luminous strip can be preferably employed for highlighting or marking contours or the like on buildings or commercially used facilities. It is noted for the sake of completeness that the luminous elements 12, designed in the form of light bars or strips, may have any desired geometric form. In addition, it is also possible to reproduce rings, curves or also fantasy designs.

While several embodiments of the present invention have been shown and described, it is to be understood that many changes and modifications may be made thereunto without departing from the spirit and scope of the invention as defined in the appended claims.

What is claimed is:

1. A luminous display element comprising:

a light line comprising a series of SMD-LED-components arranged on a carrier material, said carrier material having electric connection elements; and an elongated light-conducting housing having a longitudinal axis extending along a length, wherein said light line is disposed within said light-conducting housing and extends along the longitudinal axis of the housing, the light-conducting housing has a recess for receiving the carrier material and comprises a reflector and a matching transparent cover having a substantially t-shaped cross-section, said light-conducting housing has at least one transparent surface serving as a light entry and exit surface, wherein any remaining surfaces on the light-conducting housing are designed as light reflecting.

2. The display element as claimed in claim 1, wherein said reflector and said matching transparent cover are coupled together to form a rectangular cross-section, said light line being arranged on a surface of the reflector, and wherein the connection between the reflector and the light-conducting housing is designed to conduct light.

3. The display element as claimed in claim 1 further comprising a separate light-conducting housing designed as a light bar that conducts light and that is disposed on a light exit surface of the light-conducting housing wherein said light line conducts light out of said light-conducting housing and into said separate light-conducting housing.

* * * * *